United States Patent [19]

Takashima et al.

[11] Patent Number: 4,734,085

[45] Date of Patent: Mar. 29, 1988

[54] V BELT

[75] Inventors: Takashi Takashima, Osaka; Keizo Nonaka, Hyogo, both of Japan

[73] Assignee: Bando Chemical Industries, Ltd., Hyogo, Japan

[21] Appl. No.: 903,346

[22] Filed: Sep. 3, 1986

[30] Foreign Application Priority Data

Sep. 4, 1985 [JP] Japan .................. 60-196310

[51] Int. Cl.$^4$ .............................................. F16G 5/16
[52] U.S. Cl. ................................... 474/242; 474/201
[58] Field of Search .............. 474/201, 242, 238, 240, 474/237

[56] References Cited

U.S. PATENT DOCUMENTS 4,526,559 7/1985 Smirl .................................. 474/201
4,533,342 8/1985 Miranti, Jr. et al. ............... 474/201

FOREIGN PATENT DOCUMENTS 0135710 3/1985 European Pat. Off. .
2389802 1/1978 France .
2515296 4/1983 France .
60-49151 3/1985 Japan .
60-59850 4/1985 Japan .
60-47948 4/1985 Japan .
60-47941 4/1985 Japan .
60-47940 4/1985 Japan .
84/04950 12/1984 PCT Int'l Appl. .

Primary Examiner—Stephen J. Novosad
Assistant Examiner—Thuy M. Bui
Attorney, Agent, or Firm—Armstrong, Nikaido, Marmelstein & Kubovcik

[57] ABSTRACT

A V belt to be used for a dry type transmission. It comprises at least one endless load carrier with cogs at the underside thereof and a plurality of blocks with slots in which said load carrier is fitted. Said load carrier and said blocks are engaged with each other in a lengthwise direction of the belt by engagement of a curved convexed surface of a slot under surface of the block with a curved concaved part which is a valley between adjoining cogs of the load carrier. Cog peaks of the load carrier are positioned above the lowermost end position of the slots of adjoining blocks at the part of rectilinear state.

17 Claims, 9 Drawing Figures

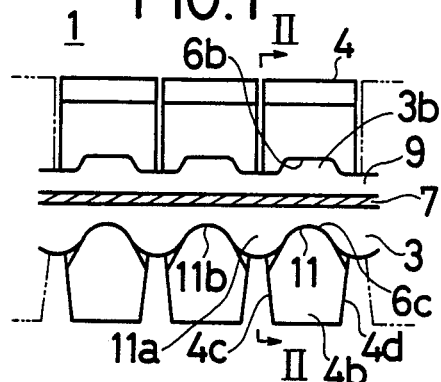
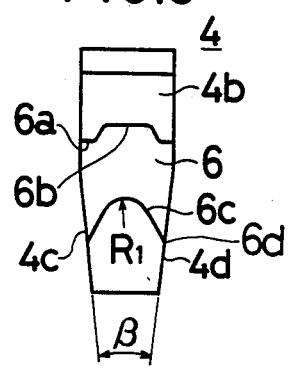
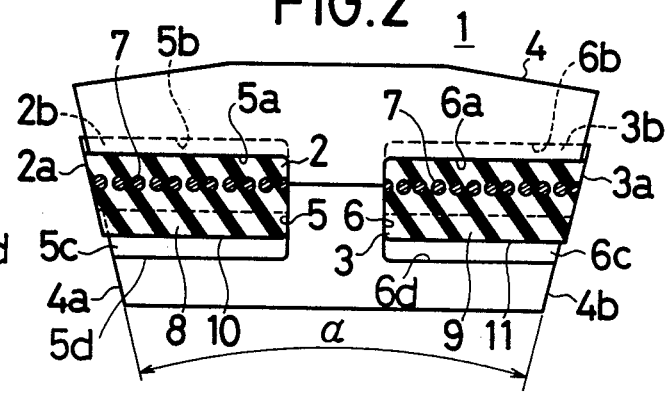
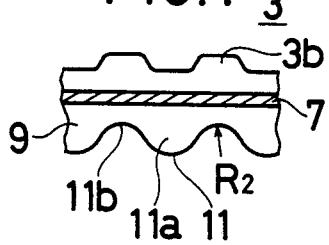
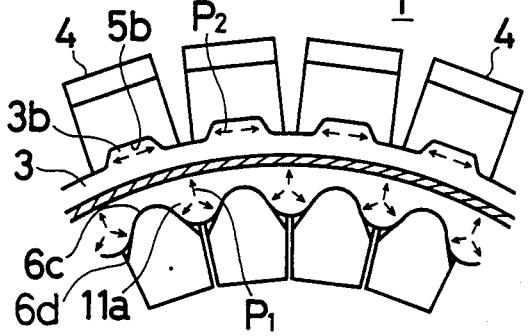

V BELT

BACKGROUND OF THE INVENTION

1. Field of the Invention:

This invention relates to a V belt which is mainly used for high load transmitting in a dry type transmission. The V belt according to the present invention is usable not only as the V belt of a continuously variable transmission for motor vehicles but also as the V belt of a continuously variable or uncontinuously variable transmission for vehicles loaded with an engine, such as agricultural machines and civil engineering machines. Also, it is most suitable for the V belt for high load of general industrial machines to be driven by electric motors. Furthermore, it can be used as a belt for transportation or printing by utilizing the upper surface of its block.

2. Background of the Art:

Generally, the V belt for motor vehicles is required to have ability to transmit very high torque, for example, when the maximum torque of 1,000 cc engine is transmitted by a rubber V belt, the V belt must stand the lateral pressure of around 20 Kg/cm². However, typical rubber V belts in practical use at present are usually used under the condition of less than 4–5 Kg/cm² and even rubber V belts for high load cannot be used under the condition of more than 10 Kg/cm².

As the V belt which meets the requirement mentioned above, the applicants previously developed and suggested such a V belt which is composed by fitting a plurality of blocks to a pair of endless load carriers by engagement of a concaved part with a convexed part, as disclosed by the Japanese Patent Application Laying Open No. 60-49,151 (corresponding to U.S. patent application Ser. No. 634,885 now U.S. Pat. No. 4,655,732).

Further studies of the applicants in this field for improving flexuosity and for application to the pulley of small diameter led them to conceive the idea of a new V belt with load carriers having cogs at their underside and blocks having at their slot under surface curved convexed surfaces, with which valleys between adjoining cogs are engaged. Such V belts, however, raised the problem that if the cog top is extending downwardly beyond the slot under surface of the block, the lower end of the cog top is compressed and deformed to a large extent at the front and rear surfaces of the block when the belt was wound round pulleys and as a reaction of it, force applied to the block becomes excessively large, with the result of earlier breakage of the block.

In the above-described V belt, since load carriers and blocks are engaged with each other only by engagement of a concaved part and a convexed part, fixing of blocks to load carriers is not firm and this causes such troubles as melting and degradation of the block due to frictional heat generates by surface pressure and slip between the load carrier and the block, breakage of the block due to reduced strength caused by high temperatures, cracks in load carriers due to hardening of rubber material and so forth, all of which relate to the shorter service life of the belt.

The applicants developed further such a V belt which has high flexuosity and applicability to a pulley of small diameter by engagement of the block and the load carrier with each other in such a fashion that the slot under surface of the block and the under surface of the load carrier correspond to each other with the least pulley diameter (for example, refer to the Japanese Utility Model Registration Application Laying Open No. 60-173746). However, since the pulley pitch diameter varies during running of the pulley, there exists the so-called "play" between the block and the load carrier in the case of the pulley diameter which is larger than the minimum pulley diameter, especially in high speed running, frictional heat generated at the engaging part is large, with the result of shorter service life of the belt.

SUMMARY OF THE INVENTION

An object of the present invention is to provide a V belt which has solved the problems raised by V belts equipped with such blocks as mentioned above.

Another object of the present invention is to provide a V belt for high load transmitting which is applicable to the pulley of small diameter and has a long service life.

For attaining the above objects, the V belt according to the present invention is composed of endless load carriers with cogs at their underside and a plurality of blocks with slots to which said load carriers are engaged. It is characterized in that said load carrier and said block are engaged with each other in a lengthwise direction of the belt by fitting a curved convexed surface at the slot under surface of the block to a curved concaved part which is a valley between adjoining cogs of the load carrier and that a cog peak of the load carrier is positioned above the lowermost position of the slot curved convexed surface of the block at the part of a rectilinear state.

A further object of the present invention is to provide V belts for high load transmitting in which fixing of the block to the load carrier is made firm so as to prolong the belt service life and to make high speed running practicable.

The above and other objects and novel features of the present invention will be more apparent from the following description made with reference to the accompanying drawings.

BRIEF DESCRIPTION OF THE DRAWINGS

The accompanying drawings show preferred embodiments of the present invention, in which:

FIG. 1 is a side view of the V belt which shows an embodiment of the present invention;

FIG. 2 is a cross section, taken along the line II—II of FIG. 1;

FIG. 3 is a side view of a block to be used for the V belt in FIG. 1;

FIG. 4 is a side view of a load carrier to be used for the V belt in FIG. 1;

FIG. 5 is a side view of the V belt in FIG. 1 which is in engagement with a pulley and in the state of power transmitting.

DETAILED DESCRIPTION OF THE INVENTION

Figure 7:
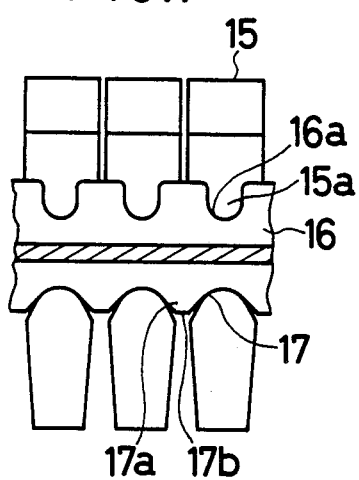
FIG. 6 to FIG. 9 are respectively an explanatory drawing of a modified example of the present invention.
Figure 6:
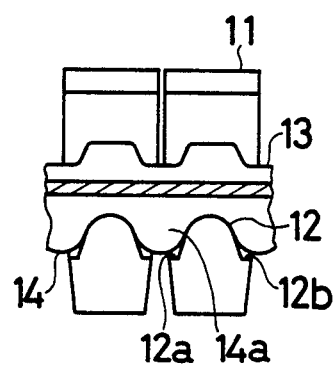

Preferred embodiments of the present invention are described below with reference to the accompanying drawings.

As shown in FIG. 1 and FIG. 2, the V belt according to the present invention is composed of a pair of load carriers 2, 3 and a plurality of blocks 4 arranged in the lengthwise direction of the load carriers. Sides 4a and 4b of the block 4 are slant, forming an angle α to correspond substantially to the groove angle of a pulley. Opposed surfaces 4c, 4d at the underside of adjoining blocks are slant, forming the angle β to correspond to the minimum pitch diameter of the pulley.

As shown in FIG. 2, slots 5, 6 which are open at the side surfaces 4a, 4b respectively are formed at the sides of the block 4. Provided at upper surfaces 5a, 6a of the slots 5, 6 are concaved parts 5b, 6b respectively. Under surfaces 5c, 6c are curved convexed surfaces, each having the radius of curvature $R_1$. In the under surfaces 5c, 6c, those parts which have the radius of curvature $R_1$ can be limited to such an extent that they make contact with load carriers 2, 3 when the V belt 1 is not wound round pulleys.

Each of the load carriers 2, 3 comprises tensile members 7 arranged substantially on the same plane and embedded in rubber members 8, 9.

One side 2a, 3a of each of the load carriers 2, 3 has an incline which is substantially the same as that of the side surface 4a, 4b of the block 4.

The side 2a, 3a of the load carrier 2, 3 and the side 4a, 4b of the block 4 are so adjusted that they are substantially on the same plane when engaged with the groove of the pulley (in power transmitting state). As shown in FIG. 2, provided at the upper surface of the load carrier 2, 3 is a convexed part 2b, 3b which engages with a concaved part 5b, 6b of the slot 5, 6 of the block 4 and provided at the under surface is a cog 10, 11.

A cog valley is formed between cog peaks of the adjoining cogs 10, 11. The cog valley is a curved concaved part of a radius of curvature $R_2$. While the under surface 5c, 6c (curved convexed surface) of the slot 5, 6 of each block 4 is engaged with each cog valley (only a cog peak 11a and a cog valley 11b are shown for the cog 11 in the drawing), the convexed part 2b, 3b of the load carrier 2, 3 is engaged with the concaved part 5b, 6b at the upper surface 5a, 6a of the slot 5, 6. By this engagement the load carrier 2, 3 and the block 4 are fixed in a lengthwise direction of the belt. When the V belt 1 is in a rectilinear state, namely, in the state where it is not wound round pulleys, the lower end of the cog peak of the load carrier 2, 3 is positioned above the lowermost position 5d, 6d of the under surface 5c, 6c (curved convexed surface) of the slot 5, 6 of adjoining blocks 4, 4.

It is so adjusted that the radius of curvature $R_1$ at the curved convexed surface of the under surface 5c, 6c of the slot 5, 6 of the block 4 and the radius of curvature $R_2$ at the cog valley between cogs 10, 11 at the underside of the load carrier 2, 3 formulate $R_1 \geq R_2$. In other words, it is so set that in the state where the V belt 1 is away from the pulley (refer to FIG. 1), the radius of curvature $R_2$ at the cog valley of the load carrier 2, 3 is almost the same as or slightly smaller than the radius of curvature $R_1$ at the curved convexed surface of the block 4.

Materials which compose the block 4 are non-metallic materials, such as plastics, hard rubber, etc., each having a large coefficient of friction and high abrasion-resistance. Tensile members 7 which compose the load carriers 2, 3 are made of synthetic fibers, such as polyamide, polyester, polyaramid, etc., inorganic fibers such as steel fiber, glass fiber, carbon fiber, etc. or mixed spinning of the foregoing fibers. Monofilament or multifilament of such fiber is made into cords or woven fabric for use as tensile members. In some cases, cords or woven fabric are substituted by film or sheets of such fiber. Materials having a high compression Young's modulus and high abrasion-resistance are required for the rubber member 8, 9. In general, conventional synthetic rubber reinforced with short fibers is used for the rubber member.

Where necessary, woven fabric is embedded in the load carrier 2, 3 close to the upper surface or the under surface thereof. In this case, such woven fabric is required to have high flexuosity and high abrasion-resistance. Fabrics woven of cotton yarn, polyamide yarn, polyaramid yarn, etc. or mixed spun yarn thereof are used generally. Synthetic resin sheet can substitute woven fabric. In the case of comparatively light load, embedding of woven fabric or synthetic resin sheet can be dispensed with.

Under the above construction, in the state where the V belt 1 is away from the pulley and is free from lateral pressure (refer to FIG. 1 and FIG. 2), the side surface 2a, 3a of the load carrier 2, 3 slightly projects from the side surface 4a, 4b of the block 4 respectively. However, since the compression Young's modulus of the load carrier 2, 3 is smaller than that of the block 4, when the V belt 1 engages with the pulley and is in power transmitting state under lateral pressure, the side 4a, 4b of the block 4 and the side 2a, 3a of the load carrier 2, 3 are substantially on the same plane and thus friction transmitting power with the pulley is generated solely at all side surfaces. In this case, since plastics, hard rubber, etc. to be used for the block 4 have a high compression Young's modulus, the V belt 1 stands a high lateral pressure and the friction transmission torque becomes large.

Cog peaks of the cog 10, 11 provided at the underside of the load carrier 2, 3, when the V belt 1 engages with pulleys, are compressed and deformed and hold therebetween the under surface 5c, 6c (curved convexed surface) of the slot 5, 6 of the block 4. Because of the formula of radius of curvature $R_1 \geq R_2$, this compressive holding takes place in any pulley diameter. Also, the smaller the pulley diameter (force applied from the pulley to the V belt 1 is large in the case of small pulley diameter), the more the compression quantity (namely, compressive force). Therefore, the block 4 is fixed at a very high degree, frictional heat generated at the engaging part is less and the belt service life is prolonged. As shown in FIG. 5, the compressive force $P_1$ generated by the cog peak being compressed acts upwardly on the tensile member 7 and therefore there is no danger of the tensile member 7 being deformed into a polygonal shape. This implies less bending fatigue and longer service life of the belt. Moreover, since the valley between adjoining cogs has the radius of curvature $R_2$, cracks do not take place easily and this contributes to the improvement of the belt service life.

Since the lower end of the cog peaks of the load carrier 2, 3 is positioned above the lowermost end position 5d, 6d of the curved convexed surface at the under surface of the slot 5, 6 of the adjoining blocks 4, 4, when winding the V belt 1 round pulleys there is no danger of the lower end of cog peaks of the load carrier being compressed and deformed to a large extent at the front and rear surfaces of the block and also such problem that the force applied to the block becomes excessively large, with the result of earlier breakage of the block, is not raised.

Since the convexed part 2b, 3b of the load carrier 2, 3 is situated outside the tensile member 7 and stretches at the time when the belt is wound round pulleys, tensile strength $P_2$ at that time acts on the wall surface of the concaved part 5b, 6b, as shown in FIG. 5, and contributes to the fixing of the load carrier 2, 3 and the block 4.

In the above embodiment, the under surface 5c, 6c of the slot 5, 6 of the block 4 is a smooth continuous surface of the whole but it is possible to increase the shear strength of the cog peak 14a by providing shoulder parts 12a, 12b at the front and rear ends of the slot under surface 12 of the block 11, thereby enabling to form the cog peak 14a of the cog 14 of the load carrier 13 in larger shape.

Figure 8:
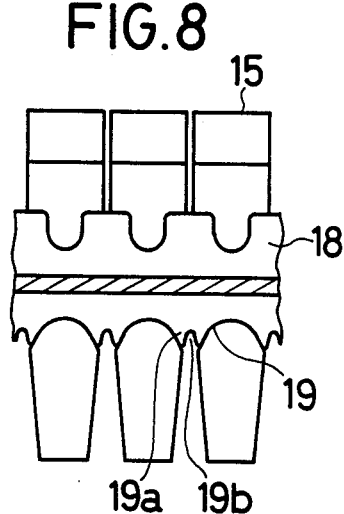

If the thickness of the block is made smaller, it can prevent the tensile member from becoming in polygonal shape, namely, smaller pitch diameter and prevention of noise can be expected. However, the smaller thickness of the block results in the lowering of shear strength of the convexed part at the upper surface of the load carrier. In order to prevent such lowering of shear strength, it is recommended to form a concaved part 16a which engages with the convexed part 15a at a tensile member 16, as shown in FIG. 7. In the V belt shown in FIG. 7, a lower end of a cog peak 17a of a cog 17 of the load carrier 16 is a flat surface 19b, but it is possible to provide a concaved part 19b at the lower end of a cog peak 19a of a cog 19 of a tensile member 18, as shown in FIG. 8, thereby adjusting the compressive deformation quantity of the cog peak of the load carrier when the belt is wound round pulleys, improving the flexuosity and lessening the heat generation of the load carrier due to compression. This also makes the contact area between the block and the load carrier 18 (valley between adjoining cogs) larger and improves the fixing of the load carrier 18 to the block.

Figure 9:
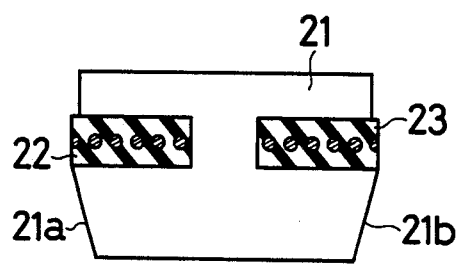

The above embodiment is applied to the V belt 1 which obtains friction transmitting power with the pulley at the sides 4a, 4b of the block 4 and the sides 2a, 3a of the two load carriers 2, 3 but the present invention is applicable to the V belt which comprises one load carrier and a plurality of blocks. Also, the present invention is applicable to the V belt which obtains the friction transmitting power as mentioned above only at the sides of the block. Moreover, the present invention is applicable to the V belt wherein only side surfaces 21a, 21b at the lower side of a block 21 make contact with the pulley, as shown in FIG. 9. In this case, load carriers 22, 23 can be fixed firmly without a means of engaging the upper surface of the load carriers 22, 23 with the slot under surface of the block 21.

At the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A V belt which is wound round at least two pulleys, comprising an endless load carrier having cogs with alternations of cog peak and cog valley at its underside and a plurality of blocks with slots in which said load carrier is fitted, said load carrier and said blocks being engaged with each other in a lengthwise direction of the belt by engagement of a curved concave part which is a cog valley between adjoining cogs of said load carrier with a curved convexed surface which extends over the whole slot under surface of the block, said curved convexed surface being at least the same size as said curved concaved surface of the load carrier, and cog peaks of the load carrier being positioned above the lowermost position of a curved convexed part of the slots of adjoining two blocks in a rectilinear state and being compressed and deformed in a state where it was wound round a pulley.

2. A V belt as defined in claim 1, wherein the block engages with the load carrier at the slot upper surface.

3. A V belt as defined in claim 1, wherein the block has a concaved part at the slot upper surface and the load carrier has at the upper surface thereof a convexed part which engages with said concaved part at the slot upper surface.

4. A V belt which is wound round at least two pulleys, comprising at least one endless load carrier having cogs with alternations of cog peak and cog valley at its underside and a plurality of blocks with slots in which said load carrier is fitted, said load carrier and said blocks being engaged with each other in a lengthwise direction of the belt by engagement of a curved concave part which is a cog valley between adjoining cogs of said load carrier with a curved convexed surface which extends over the whole slot under surface of the block, a top end of the convexed part which is a cog peak of the load carrier between adjoining two blocks has a concaved part at the top end thereof and the load carrier makes contact with almost the whole of the curved convexed surface of the slot of the block.

5. A V belt as defined in claim 1, wherein a top end of the convexed part of a cog peak of the load carrier between adjoining blocks is a flat surface.

6. A V belt as defined in claim 1, wherein shoulder parts are formed at the front and rear ends of the slot under surface of the block.

7. A V belt as defined in claim 1, wherein the convexed part which is a cog peak of the load carrier between adjoining blocks has a concaved part at the top end thereof.

8. A V belt as defined in claim 1, wherein the block makes contact with a pulley surface of the pulley only at side surfaces which are positioned below the load carrier.

9. A V belt as defined in claim 1, wherein the cogs are shaped insuch a fashion that a cog peak and a cog valley correspond with each other.

10. A V belt which is wound round at least two pulleys, comprising at least one endless load carrier having cogs with alternations of cog peak and cog valley at its underside and a plurality of blocks with slots in which said load carrier is fitted, said load carrier and said blocks being engaged with each other in a lengthwise direction of the belt by engagement of a curved concave part which is a cog valley between adjoining cogs of said load carrier with a curved convexed surface, the radius of curvature of said curved convexed surface of said block being at least as large as the curved concaved surface of the load carrier and the cog peak of the load carrier being compressed and deformed in the state where the belt was wound round a pulley.

11. A V belt as defined in claim 10, which is provided with two load carriers and the block extends in the belt width direction and has two slots which open to each side surface of the block.

12. A V belt as defined in claim 10, wherein the block engages with the load carrier at the slot upper surface.

13. A V belt as defined in claim 12, wherein the block has a concaved part at the slot upper surface and the load carrier has at the upper surface thereof a convexed part which engages with said concaved part.

14. A V belt as defined in claim 10, wherein a top end of the convexed part which is a cog peak of the load carrier between adjoining two blocks is a flat surface.

15. A V belt as defined in claim 10, wherein the block has, at the front end and rear end of the slot under surface, shoulder parts which are smaller than the curved convexed surface.

16. A V belt as defined in claim 10, wherein the block makes contact with the pulley surface only at the side surfaces which are positioned below the load carrier.

17. A V belt as defined in claim 15, wherein the block makes contact with the pulley surface only at the side surfaces which are positioned below the load carrier.

* * * * *